US008375106B2

(12) United States Patent
Sparks

(10) Patent No.: US 8,375,106 B2
(45) Date of Patent: Feb. 12, 2013

(54) LOADING A MOBILE COMPUTING DEVICE WITH MEDIA FILES

(75) Inventor: David L. Sparks, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,771

(22) Filed: Sep. 29, 2011

(65) Prior Publication Data

US 2012/0110135 A1 May 3, 2012

Related U.S. Application Data

(63) Continuation of application No. 12/914,635, filed on Oct. 28, 2010.

(51) Int. Cl.
*G06F 15/16* (2006.01)
*G06F 17/30* (2006.01)
(52) U.S. Cl. .......................... 709/219; 707/104
(58) Field of Classification Search .................. 709/219; 707/104
See application file for complete search history.

(56) References Cited

U.S. PATENT DOCUMENTS

| 7,102,067 | B2 | 9/2006 | Gang et al. | |
|---|---|---|---|---|
| 7,678,984 | B1 * | 3/2010 | Lamere | 84/615 |
| 2003/0089218 | A1 | 5/2003 | Gang et al. | |
| 2005/0108303 | A1 | 5/2005 | Carter | |
| 2006/0116965 | A1 | 6/2006 | Kudo et al. | |
| 2006/0195516 | A1 | 8/2006 | Beaupre | |
| 2007/0131097 | A1 | 6/2007 | Lu et al. | |
| 2008/0065844 | A1 | 3/2008 | Heller | |
| 2008/0165906 | A1 | 7/2008 | Ho et al. | |
| 2008/0201000 | A1 | 8/2008 | Heikkila et al. | |
| 2009/0055426 | A1 * | 2/2009 | Kalasapur et al. | 707/102 |
| 2009/0063976 | A1 * | 3/2009 | Bull et al. | 715/716 |
| 2009/0077084 | A1 | 3/2009 | Svendsen | |
| 2009/0104938 | A1 | 4/2009 | Tang | |
| 2009/0164516 | A1 * | 6/2009 | Svendsen et al. | 707/104.1 |
| 2009/0254593 | A1 | 10/2009 | Halim et al. | |
| 2010/0010944 | A1 | 1/2010 | Cheng et al. | |
| 2010/0057658 | A1 | 3/2010 | Fein et al. | |
| 2010/0083303 | A1 | 4/2010 | Redei et al. | |
| 2010/0312369 | A1 * | 12/2010 | Dollar, Jr. | 700/94 |

(Continued)

FOREIGN PATENT DOCUMENTS

WO    WO2005/114472    12/2005

OTHER PUBLICATIONS eHow.com. "How to Sync a Playlist on an iPod." [Retrieved on Aug. 11, 2010]. Retrieved from the Internet URL: <http://www.ehow.com/how_2016218_sync-playlist.ipod.html> 1 page.

(Continued)

*Primary Examiner* — Philip Lee
(74) *Attorney, Agent, or Firm* — Fish & Richardson P.C.

(57) ABSTRACT

In general, the subject matter described in this specification can be embodied in methods, systems, and program products for loading media files to a mobile computing device. A media library that includes media files is stored at a server system. Information indicating a present state of the mobile device is accessed, where the present state is based on the device being at a geographical location at a present time. Information indicating a previous state of the mobile device is accessed, where the previous state is based on the device being at a previous geographical location at a previous time. A selection of preferred media files are accessed based on the present state and the previous state. A selection of a subset of media files are accessed based on the preferred media files. At least a portion of each media file in the subset is transmitted to the mobile device.

16 Claims, 6 Drawing Sheets

U.S. PATENT DOCUMENTS

2010/0329633 A1* 12/2010 Lafond et al. ............... 386/241
2011/0093488 A1* 4/2011 Amacker et al. ............. 707/767
2011/0295843 A1 12/2011 Ingrassia et al.

OTHER PUBLICATIONS

MP3Tunes. "MPTunes—Fre online MP3 file storage and backup." Sep. 12, 2007 [Retrieved 17 on Aug. 9, 2010]. Retrieved from the Internet <URL: http://www.online-tech-tips.com/coolwebsites/mp3tunes-free-online-mp3 . . . > 6 pages.

Ortutay, Barbara. "Startup mSpot lets you stream your music over Web." [Retrieved on Jun. 28, 18 2010]. Retrieved from the Internet <URL: http://abcnews.go.com/Technology/wireStory?id=11036314> 2 pages.

Wikipedia. "MP3.com." [Retrieved on Oct. 27, 2010]. Retrieved from the Internet <URL: http://en.wikipedia.org/wiki/MP3.com> 4 pages.

Authorized Officer K. Sommermeyer. International Search Report and Written Opinion in international application No. PCT/US2011/055790, dated Dec. 14, 2011, 10 pages.

Office Action issued in U.S. Appl. No. 12/914,635 on Nov. 23, 2011, 23 pages.

Restriction Requirement issued in U.S. Appl. No. 12/914,635 on Jul. 5, 2012, 3 pages.

\* cited by examiner

Media Preferences Database

| | Time Played | Starting Location | Ending Location | User-Defined Content |
|---|---|---|---|---|
| Song A 212 | Tuesday Evening 214 | Work 216 | Home 218 | Text: "Driving Home!" |
| | Wednesday Evening 224 | Work 226 | Home 228 | Email: "Done with work" |
| | Thursday Evening 234 | Work 236 | Home 238 | Voice Query: "pizza places" |
| Song B 240 | 8:30 am 8/14/2010 244 | (44.975221450, 93.246630281) | (44.977629236, 93.241229653) | |
| | 9:56 am 8/21/2010 | (44.976240360, 93.243488073) | (44.979924982, 93.242710232) | Micro-Blog Post: "Running!" |
| Song C 260 | 12:05 pm 8/17/2010 264 | 55454 | 55454 | Calendar: "Exercise at gym" |
| | 12:25 pm 8/30/2010 | 55454 | 55454 | Calendar: "Exercise at gym" |

FIG. 2

LOADING A MOBILE COMPUTING DEVICE WITH MEDIA FILES

CROSS-REFERENCE TO RELATED APPLICATIONS

This application is a continuation application of and claims priority to U.S. application Ser. No. 12/914,635, filed on Oct. 28, 2010.

TECHNICAL FIELD

This document generally relates to loading a mobile computing device with media files

BACKGROUND

Mobile computing devices, such as mobile telephones, may include media players that allow users of the devices to play media, for example, audio books, music, and video. The media may be stored locally on the mobile computing device. Also, the media may be stored remote from the mobile computing device. For example, a user of a mobile device may request that a server system streams media to the mobile computing device. The user of the mobile computing device may consume a beginning portion of media content that has already been transferred to the mobile computing device while a later portion of the media content is streamed to the mobile computing device.

SUMMARY

In general, one aspect of the subject matter described in this specification can be embodied in a computer-implemented method for loading media files to a mobile computing device. The method includes storing, at a server system, a media library that includes media files. The method includes accessing information that indicates a present state of the mobile computing device. The present state was determined based on the mobile computing device being at a present geographical location at a present time. The method includes accessing information that indicates a previous state of the mobile computing device. The previous state was determined based on the mobile computing device being at a previous geographical location at a previous time. The method includes accessing a selection of preferred media files from the media library. The preferred media files were selected based on the present state of the mobile computing device and the previous state of the mobile computing device. The preferred media files were output by the mobile computing device during the previous state in response to a request from a user of the mobile computing device that the at least one preferred media file be output by the mobile computing device. The method includes accessing a selection of a subset of the media files. The subset was selected based on the preferred media files. The method includes transmitting, by the server system and to the mobile computing device, at least a portion of each media file in the subset.

Another aspect of the subject matter described in this specification can be embodied in a computer-implemented method for loading media files to a mobile computing device. The method includes determining, by a mobile computing device, a present geographical location of the mobile computing device and transmitting the present geographical location for receipt by a server system. The method includes receiving, at the mobile computing device and from the server system, at least a portion of each media file in a subset of media files that have been selected from a media library that is stored at the server system. The at least portions of the media files are received in response to the server system accessing information that indicates a present state of the mobile computing device, wherein the present state was determined based on the mobile computing device being at the present geographical location at a present time. The at least portions of the media files are received in response to the server system accessing information that indicates a previous state of the mobile computing device, wherein the previous state was determined based on the mobile computing device being at a previous geographical location at a previous time. The at least portions of the media files are received in response to the server system accessing a selection of preferred media files from the media library, wherein the preferred media files were selected based on the present state of the mobile computing device and the previous state of the mobile computing device, wherein the preferred media files were output by the mobile computing device during the previous state in response to a request from a user of the mobile computing device that the at least one preferred media file be output by the mobile computing device. The at least portions of the media files are received in response to the server system accessing a selection of the subset of the media files, wherein the subset was selected based on the preferred media files. The at least portions of the media files are received in response to the server system transmitting, by the server system and to the mobile computing device, at least a portion of each media file in the subset.

These and other implementations can optionally include one or more of the following features. Transmitting at least a portion of each media file in the subset may include transmitting the at least a portion of each media file in the subset to the mobile computing device before the mobile computing device outputs more than one of the media files in the subset. The preferred media files may have been selected based on a determination that the present state of the mobile computing device matches the previous state of the mobile computing device. The determination that the present state matches the previous state may have been made based on a determination that: (i) the present geographical location is within a predetermined distance of the previous geographical location, and (ii) the present time is within a predetermined time period of the previous time. The time period may be less than twenty four hours. The previous time may have occurred more than twenty four hours before the present time.

The determination that the present state matches the previous state may have been made based on a determination that: (i) the present geographical location is bounded within an area that also bounds the previous geographical location, and (ii) the present time is within a time period that includes the previous time. The determination that the present state matches the previous state may have been made based on a matching computation in which a match is more likely to be determined: (i) when the present geographical location is a first distance from to the previous geographical location than when the present geographical distance is a second distance from the previous geographical location, the first distance being shorter than the second distance, and (ii) when the present time is a first distance from the previous time than when the present time is a second distance from the previous time, the first distance being shorter than the second distance.

The information that indicates the present state of the mobile computing device may be further determined based on a statement that was defined by a user of the mobile computing device at the present time. The information that indicates the previous state of the mobile computing device may be further determined based on a statement that was defined by a user of the mobile computing device at the previous time. The method may further include receiving, at the server system and from the mobile computing device, a request for causing the server system to transmit to the mobile computing device media files from the media library. In response to the request: (i) the accessing information that indicates the present state of the mobile computing device is performed, and (ii) the accessing the information that indicates the previous state of the mobile computing device is performed.

The subset of media files may only include the preferred media files. Selecting the subset of media files may include selecting from the media library additional media files for inclusion in the subset. The additional media files may be selected for inclusion in the subset based on the additional media files and the preferred media files sharing attributes that correspond to musical characteristics of the respective additional and preferred media files. Selecting the subset of media files may include selecting from the media library additional media files that are starting media files in particular user-generated playlists. A starting media file may be a media file that begins a playlist based on a sorting of the playlist. The particular playlists may be a subset of a collection of user-generated playlists. The particular playlists may be selected as the subset based on the particular playlists including a predetermined quantity of preferred media files.

Selecting the subset of media files may include selecting from the media library at least two additional media files based on the at least two additional media files being starting media files for different sortings of a particular playlist. The particular playlist may not be displayed by the mobile computing device in at least one of the sortings without a user of the mobile computing device providing user input that causes the particular playlist to be displayed in the at least one sorting.

Other aspects of the subject matter described in this specification can be embodied in a computer-readable storage device storing instructions that, when executed by one or more processing devices, perform operations according to the above-described methods.

In yet another aspect, the subject matter described in this specification can be embodied in a computer-implemented system. The system includes one or more storage devices. The storage devices store a media library that includes computer-readable media files. The storage devices store instructions that, when executed by one or more processing devices, cause the one or more processing devices to implement a preferred media determiner, a similar media determiner, and a media loader. The preferred media determiner is configured to: (i) access information that indicates a present state of a mobile computing device, wherein the present state was determined based on the mobile computing device being at a present geographical location at a present time; (ii) access information that indicates a previous state of the mobile computing device, wherein the previous state was determined based on the mobile computing device being at a previous geographical location at a previous time; (ii) select preferred media files from the media library based on the present state of the mobile computing device and the previous state of the mobile computing device, wherein the preferred media files were output by the mobile computing device during the previous state in response to a request from a user of the mobile computing device that the at least one preferred media file be output by the mobile computing device. The similar media determiner is configured to select, based on the preferred media files that are selected, a subset of the media files in the media library. The media loader is at a server system, and is programmed to transmit at least portions of each of the media files in the subset to the mobile computing device.

The instructions, when executed by the one or more processing devices, may cause the processing devices to implement a state determiner, at the mobile computing device, that is programmed to periodically transmit, to the server system for storage in a media preferences database: (i) an indication of a media file that is presently playing at the mobile computing device, and (ii) a present geographical location of the mobile computing device. The preferred media determiner may access the media preferences database to determine the preferred media files. The similar media determiner may be configured to select at least some of the subset of media files based on the at least some media files sharing musical characteristics with the preferred media files.

Particular embodiments can be implemented, in certain instances, to realize one or more of the following advantages. A mobile computing device with limited local memory may locally store media files that a user of the mobile computing device is most likely to request that the mobile device play. Such media files may play without buffering over a network connection, and may play even if the mobile computing device is unable to connect to a network. Local memory space may be made available for other applications or may be reduced.

The details of one or more implementations are set forth in the accompanying drawings and the description below. Other features, objects, and advantages will be apparent from the description and drawings, and from the claims.

DESCRIPTION OF DRAWINGS

FIG. 2 illustrates an example of content in a media preferences database.

Like reference symbols in the various drawings indicate like elements.

DETAILED DESCRIPTION

This document describes techniques, methods, systems, and mechanisms for loading a mobile computing device with media files. In general, a user of a mobile computing device may use the device to navigate a media library that is hosted by a remote server system. The server system may pre-load at least a beginning portion of some of the media files to the mobile device so that when a user of the mobile device requests that one of the pre-loaded media files plays on the mobile device, the beginning portion of the media file does not need to be retrieved from the server system and may play immediately.

The media files that are pre-loaded to the mobile device may be selected based on the media files having previously been played when the mobile device was in a previous state that matches a present state. The previous and present states may be identified based on a location of the mobile computing device, a time at which the mobile computing was at the location, and user-defined statements (e.g., text messages, search queries, or emails) that the user submitted at a particular time.

In addition to the media files which are selected based on having been played while in a matching state, other media files can be selected for pre-loading to the mobile computing device. These other media files may be media files that have been assigned attributes that describe a content of the other media files, where the attributes of the other media files match attributes of the media files that were played in a matching state. Other media files may also be selected as the beginning media files in a sorting of a user-generated playlist.

Figure 1:
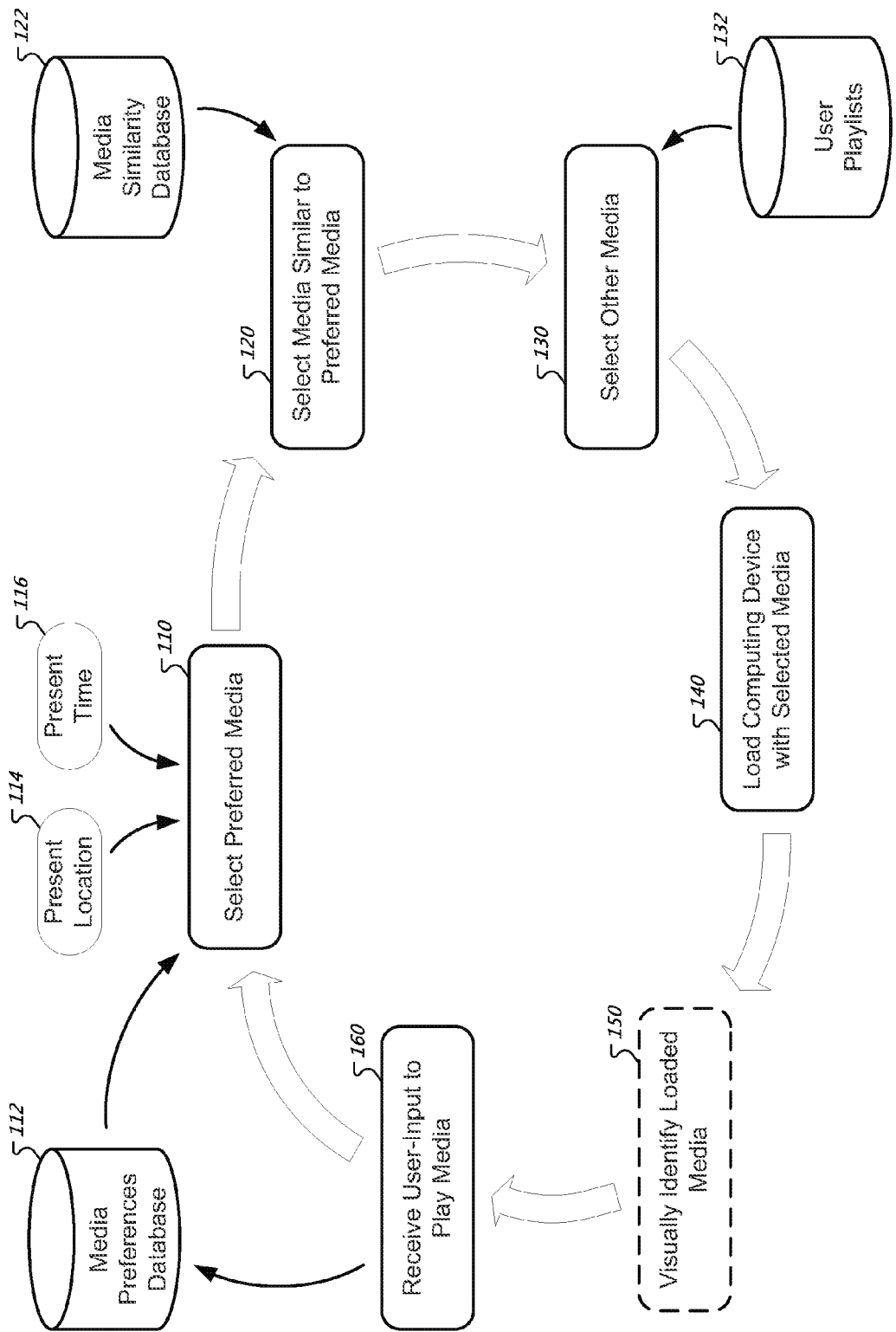
FIG. 1 illustrates an example of a method for loading a mobile computing device with media files.

FIG. 1 illustrates an example of a method for loading a mobile computing device with media files. A user of a mobile computing device may use the device to browse a media library. While the user may be able to browse and view information on all of the media files in the library, the media content itself may be stored remotely by a server system that is accessible over the internet. Some of the media files that are stored remotely, or beginning portions thereof, may be transmitted to the mobile device prior to the user playing the media files. In this case, when a user plays the loaded media file, the file may immediately play a beginning portion of the loaded media file without network buffering.

The media files (or portions of files) that are loaded onto the mobile computing device may be automatically determined based on which media files the user has previously played when in a similar geographic region and during a similar time period. For example, on weekends a user may visit his lake house and play blues music while at the lake house. While in the city during the week, the user may listen to hip-hop music. Accordingly, when the user visits his lake house, the mobile device or online media service may determine that blues music should be loaded to the user's mobile device. The blues music may replace hip-hop music that had been previously loaded onto the device. In some examples, a playlist is generated based on the music that is pre-loaded to the mobile device.

In various implementations, the determination of which media to load onto the mobile device may be based on various additional factors. For instance, the determination may include whether or not a media file is displayed in a prominent position in a playlist. For example, when a user views a playlist of media files, the media files may be displayed in a sorted order (e.g., an alphabetical order by artist). Those media files that are at a most-prominently displayed in the sorted order (for example, those starting media files that begin a playlist based on a sorting of the playlist) may be loaded onto the mobile computing device because those files may be more likely to be played by the user. In some examples, a user of a mobile device is able to change a type of playlist sorting (for example, switch from alphabetical sorting by artist to alphabetical sorting by song name). Media that is to be most-prominently displayed for each type of sorting may be loaded to the mobile device. In various examples, the most-frequently played media file (in the collection or in a playlist) may be loaded to the mobile device.

In various implementations, the determination of which media to load onto the mobile computing device may be based on recent and previous user-defined statements. For example, a system may store user-defined statements (or keywords pulled from user-defined statements) that a user makes using the mobile computing device. A user-defined statement can include content of text messages, emails, and voice and text queries. Particular media files may be loaded onto the mobile computing device if the user has recently provided a user-defined statement that matches a previous user-defined statement at a time when the particular media files were played.

As described above, a user of a mobile device may be able to browse a media library. For example, the user may select a "Media Player" graphical interface element on a desktop of his mobile telephone and a graphical interface for browsing the user's collection of media files may appear. The media player graphical interface may allow the user to view various displays of media files in the media library. For instance, the user may choose to view only music media files (instead of video media files, audio book media files, and application program media files). When in the music media file "view," the user may elect to view the music files as sorted by artist, album, genre, song name, or playlist.

A playlist may be a user-defined subset of the media library. For example, a user may have created an "Exercising" playlist of music that includes songs that the user listens to when he exercises. Accordingly, when the user exercises, he may play (i.e., cause the mobile computing device to output the media, for example, either audibly and/or visually, as appropriate) a song in the playlist. When the playing song finishes, the media player may play a next song from the playlist, and may terminate playing songs when all of the songs in the playlist have been played.

The media library that the user browses may reference hundreds or even thousands of media files. These media files may require significant memory. In some instances, the media files may require more memory than the mobile device includes, or more memory than the mobile device has available as free space. Further, a user may not want to use a mobile device that includes the requisite free space for locally storing the entire media collection (e.g., because of additional cost or size). Accordingly, while the user may browse the media library using the mobile computing device, the media files themselves may be stored remotely at a server system. Thus, in some implementations, metadata about some or all of the media files is stored locally on the mobile device, with the corresponding media content stored at the server system. When a user selects a media file to play, the media file may be transmitted, or streamed, from the server system to the mobile computing device.

In various implementations, the mobile computing device may be loaded with some of the media files (or portions of the media files) from the library, so that when a user instructs the mobile computing device to play a loaded media file, the media file immediately plays. This loading may occur while the user is not using the mobile computing device, for example, while the device is in the user's pocket, docked, or locked so that the screen is off. When a media file has been loaded to the mobile device, the mobile device may be able to play the media file, or a portion thereof, without the user waiting for the file to be transmitted over a network. The mobile device may be able to play the locally-stored media files even when network service is unavailable.

The mobile computing device (or a server system that hosts the music service) may select a subset of the media files in the library that are to be loaded onto the mobile computing device. At box 110, a collection of preferred media files may be selected based on a present state of the mobile computing device. The preferred media files may include those media files that the mobile device (or another mobile device on which the user had previously authenticated) has played while the mobile device was in a same or similar state. The present state of the mobile device may be identified based on any combination of mobile device location (box 114), time (box 116), and user-defined statements (not illustrated). Example locations, times, and user-defined statements are discussed with reference to FIG. 2.

The present state may be compared against previous states to identify previous states that match the present state, and media that was played while in these matching previous states. The previous state information and indications of media that was played while in the previous states may be contained in a Media Preferences Database 112.

Two states may match if a present geographical location of the mobile device is near a previous geographical location of the mobile device. The present and previous locations may be near each other if both locations are within a same geographical region (for example, a predetermined and bounded geographic area). Examples of geographical regions may include city neighborhoods, cell-tower transmitting regions, and city blocks.

In some examples, present and previous locations are near each other if the locations are a predetermined distance from each other. For example, where the present and previous locations are represented by geographical coordinates, the locations may be near each other if they are within 500 meters. The predetermined distance may vary based on a region of the locations. For example, 500 meters may be a threshold for identifying a "near" location in a metropolitan area, but 2000 meters may be the threshold for identifying a "near" location in a rural area.

In some examples, a "location score" is determined based on a geographical distance between a present and a previous location, where the score is assigned a greater value the nearer the present and previous locations are to each other. As two locations become closer together, the location value becomes "greater," which can refer to the location score increasing or decreasing, based on various implementations. The location score may be used, alone or along with one or more additional scores (e.g., a time score and a user-defined statements score), to determine if two states match. The combination of these scores to determine if a present and a previous state match is discussed in more detail below, after the discussion of the time score and the user-defined statements score.

Two states may be a match if a present time of the mobile computing device is near a previous time of the mobile device. The present and previous times may be near each other if both times are within similarly defined time periods. A time period may be a reoccurring portion of a day. Examples of time periods include Monday afternoons, Wednesday mornings, Weekday evenings, Weekends, and specific holidays. Each time period may be associated with a beginning time and an ending time (e.g., noon to 3 pm).

In some examples, a "time score" is determined based on distance between a present and a previous time, where the score is assigned a greater value the nearer the present and previous times are to each other. The times may be stored as information that identifies a time of day (e.g., an hour and minute) and a date (e.g., Jan. 5, 2010). A distance, however, may disregard the date. For example, 10:54 am on a first day may be determined to be 16 minutes away from 11:10 am on a second day, irrespective of the dates.

In various examples, all weekdays may be treated the same and all weekends may be treated the same. Thus, 3:04 pm on Thursday may be treated as being 10 minutes away from a time 3:14 pm on a previous Monday. However, 3:14 pm on the Monday may be treated as being approximately 24 hours away from 3:11 pm on Sunday (e.g., because Monday and Sunday are not treated as being a same "day"). In some examples, the older a past time, the distance between the times may be increased. For example, a time of 3:14 on a Monday that was six months ago may be treated as being 55 minutes away from the present time of 3:04 on Thursday to compensate for a possible change in listening preferences over the last six months. As discussed below, the time score may be used, alone or along with one or more additional scores (e.g., a location score and a user-defined statements score) to determine if two states match. The combination of these scores to determine if a present and a previous state match is discussed in more detail below, after the discussion of the user-defined statements score.

Two states may match if a recent user-defined statement includes content that is the same as the content in a previous user-defined statement, or where the content in the recent user-defined statement is determined to reference a concept that is referenced by concept in a previous user-defined statement. User-defined statements may be textual or voice statements that a user provided using the mobile computing device. Examples of statements include textual content from text messages, emails, or note-taking programs and transcribed verbal content provided through verbal search queries or verbal voice commands.

A prior statement may be evaluated against a recent statement based on content (e.g., do keywords in the statements match and how many of the keywords match) and whether the statements occurred during times that were "near" each other (e.g., as described above). Keywords may match if the keywords are the same, or if the keywords are each associated with a predefined concept that is the same. The older a "present" statement, the less relevance the statement may have on the present state of the mobile telephone. A "statement score" can be calculated based on a keyword similarity and time-distance between statements.

As noted above, various combinations of, for example, location, time, and user-defined statements may be used to determine if states match. For example, both a present and a previous location and associated times may need to match for the present state to match the previous state. In some examples, a location score and a time score may be used to determine if states match. For example, the scores may be used in a calculation that combines the scores by summing or multiplying the scores, potentially with varying weighting variables to adjust the overall contribution of the factors, and in some instances additional factors may be included. In some examples, matching states may be identified as those states that exceed a threshold value (e.g., those states with combined scores that exceed a value of 352, those states where individual factors of a score exceed corresponding threshold values, or those states where any of the individual factors of a score exceeds a threshold value). In some examples, matching states may be identified as the highest N matching states. For example, the present state may be measured against multiple other previous states to identify matching states. The top fifty states may be selected as matching states.

The media files that were played during each of the matching, previous states, may be selected as a preferred collection of media files. Thus, this preferred collection of media files may include those media files that were played at a similar location, during a similar time period, and when the user defined similar statements. The quantity of preferred media files that are selected may be based on pre-defined requirements (e.g., a specific number of files or quantity of disk space to be consumed) or based on pre-defined scoring requirements (e.g., a specific score which previously played media file's states must surpass).

In some examples, the preferred collection of media files is based not only on media files that the user has previously played, but based on media files that other users have previously played. The other users may be related to the user in a social network, and the influence of other users' music listening habits may be based on the other users' distance from the user in the social network. For example, if a "friend" of the user (e.g., an individual that has agreed to receive all the user's posts, and for which the user has provided permission to view his personal details page) listens to a particular song at a similar time and location as the user's present time and location, then the particular song may be selected as a preferred media file. If the song was played by a "friend of a friend," then the song may be scored less favorably, and may or may not be selected as a preferred media file. The other users may be individuals that have authenticated to the music service with a different user account name and password.

As described in more detail below, a selection of preferred media files may be based not only on media files that have been played in matching, previous states, but media that is presently being played by the mobile computing device.

The preferred media may be "seed" media files for computer-generated selection of similar media files that are to be loaded on the mobile computing device (box 120). Referencing the above illustration, the user of the mobile telephone may be at his lake house during the weekend, and thus the preferred media may include a collection of blues songs that the user has played while at the lake house on the weekends. The mobile device, however, may have loaded more than just the blues songs that the user has played while at the lake house (i.e., the preferred media). Indeed, the device may have loaded other blues songs that were not previously played while at the lake house, but that the online media service determined included attributes that matched attributes of the songs that were played while at the lake house.

For example, the online media service may transmit information that identifies the preferred songs, along with information describing the content of the user's media collection, to a system that determines media in the user's media catalog that is similar to the preferred media. The determination of similar media may include accessing a media similarity database 122 that includes, for each of multiple songs in the catalog, attributes that correspond to characteristics of the song. Example characteristics include gender of the lead vocalist, level of distortion of an electric guitar, type of background vocals, genre of media, etc. Each characteristic may be assigned a numeric value between one and five. Given the stored set of attributes for a media file, similar media files may be identified based on, for example, a vector distance function.

In various examples, the media that is selected as being similar to the preferred media is assigned a relevance score that identifies a level of the similarity. In various examples, media that is not in the user's media catalog (e.g., media that the user has not previously designated as being in the media catalog) may be identified as similar media. Thus, the user's mobile device may be loaded with "suggested" music that the user may not have heard before, where the suggested music is based on the user's past listening preferences while in a similar state.

In various examples, other media is selected for loading onto the mobile device (box 130). In some examples, the selection of other media content is based on the media content in user-generated playlists (box 132). As an illustration, a user may use his mobile device to view a playlist of media files. The playlist may be viewed in a sorted order so that some of the media files appear more prominently than other media files (e.g., some of the files appear at a top of a list). The mobile computing device may load the most-prominently displayed media file based on the sorted-order of the playlist, as the user may be more likely to play this media file than others. In various examples, the top N media files in a sorted order are loaded. In various examples, the media files that are displayed in an initial view of the playlist upon launching the application are loaded (e.g., the media files that are viewed without the user scrolling down).

In various examples, the user may select graphical user interface elements to change a sorting of a playlist. For example, the user may view a playlist that is presently sorted in alphabetical song name order. The mobile device may include interface elements for re-sorting the playlist based on artist name, album name, genre, length, or dates that the media files were added to the media library. In some examples, the mobile device may be loaded with one or more most-prominently displayed media files for one or more of these other sortings, even though the playlist may be presently configured to not display in the other sortings. Thus, if a user views a playlist that is sorted alphabetically by song name and selects to view the playlist in a chronological order of date added, the chronologically most relevant media files may have been already loaded to the mobile device before the user changed the sorting.

In various examples, most-prominently displayed media files for one or more of the above-described "other" sortings may be loaded based on a popularity of user use of the "other" sortings, either when used to sort a particular playlist, or when generally used to sort media in the library. In some examples, an amount of most-prominently displayed media files that are loaded for a particular playlist may be based on how "popular" the playlist is for a present state of the mobile device. The popularity of a playlist for a present state can be determined based on how many of the media files in the playlist are "preferred" and how many are "similar."

In various examples, when a playlist has been determined to be "popular," the entire playlist is loaded to the mobile device or the most frequently-played media in the playlist are loaded to the mobile device, irrespective of whether these most frequently-played media are preferred media (see box 110) or similar media (see box 120). Similarly, when a non-playlist group of media (e.g., a particular "album," "artist," or "genre") is determined to be popular, additional media from the non-playlist group of media may be selected for loading to the mobile device. The selection of preferred media, similar media, and other media for loading to the mobile computing device is discussed in more detail throughout this document, for example, with reference to FIG. 4.

In box 140, the selected subset of the media in the collection (e.g., the preferred media referenced with respect to box 110, the similar media referenced with respect to box 120, and the other media referenced with respect to box 130) is loaded to the mobile computing device. Loading the media files may include loading a beginning portion of the media files in the selected subset or the entire media files in the selected subset. In various examples, some of the selected subset of media files are fully loaded and some are partially loaded (e.g., the preferred media may be fully loaded and the similar media and other media may be partially loaded). The mobile computing device may designate a particular amount of memory as available, or as reserved for loading media. Thus, some of the low-scoring media that has been selected may not be loaded based on these memory-constraints.

The selected media may be transferred over a network to the mobile computing device. The media that is presently stored on the mobile computing device may be removed, so that the transferred media replaces the presently stored media. In this manner, the mobile device may include a portion of memory that is designated to store media that has been determined to be of likely interest to the user based on the present state of the mobile device. The mobile device may also include media files that are stored on a more permanent basis (that is, until a user of the mobile device decides that they should be removed or replaced).

The media may be transferred to the mobile device without the mobile device providing any audio-visual indication that the media is being transferred. Accordingly, the mobile device may periodically (e.g., every 10 minutes) determine a present state of the mobile device and the media content that is most relevant to that determined state. In some examples, the determination of the state may be triggered by moving of the mobile computing device (e.g., when the user walks to his car with the mobile device after a day of work and the mobile device remaining in a stationary state). Accordingly, a user may have set his mobile device down for a period of time, and when he picks the device up a different set of media files have been loaded to the mobile device without the user providing user input.

In box 150, the loaded media is visually identified. In some examples, those media files that have been loaded are displayed to a user of the mobile device differently than those media files that have not been loaded. For example, a display of a loaded media file in a playlist may be supplemented by an icon or may appear a different color than if the media file had not been loaded to the mobile device. Thus, a user may be able to discern which of the media files have been loaded to the mobile device when the user browses his music collection. In some examples, a user may provide input that causes a loading of the media files that are associated with a present state of the mobile device, but that does not play the media files.

In some examples, visually identifying the loaded media includes the mobile device visually displaying a playlist that the mobile device has generated based on the loaded media. For example, the mobile device may include a "Music Selected for You" playlist, where the music is automatically selected for inclusion in the playlist based on the present state of the mobile device.

In box 160, the mobile device receives user-input to play a media file. For example, a user may select a particular song that the user would like to listen to. In response to the selection (and the song playing), the media preferences database 112 stores an indication of the song and the present state of the mobile computing device, so that the song (and similar songs) can be selected for loading when the mobile device is again in a similar state. Playing the media file may entail accessing a portion of a media file that is stored in local memory on the mobile device and transferring the portion of the media file, or media content therein, to temporary memory (e.g., RAM) for access by an application program. The application program may output the accessed portion of the media file and request that a remaining portion of the media file be transferred from a server system. In other words, the mobile device may audibly output a beginning portion of the media file while a remaining portion of the media file is buffered in a transmission from the server system.

As referenced above, the selection of preferred media files (at box 110) may be based not only on media files that were played during a previous state that is similar to a present state, but can also be based on those media files that are presently playing or that have recently played. For example, the user of a mobile computing device may have, upon arriving at his lake house, provided user-input to play a blues song. Blues songs have already been loaded into the mobile device automatically, but based on the presently playing blues song the selection of media files for loading to the mobile device may be refined.

For example, a next song in an album or playlist that includes the presently playing blues song may be loaded to the mobile telephone. The presently playing playlist or album may be weighted more heavily and additional media files from that playlist or album may be loaded to the mobile device. In some examples, an entire playlist or album may be loaded to the mobile device. Further, the selection of "similar" media may be modified so that more songs that are like the song that is presently playing are loaded to the mobile device. The modification of loaded media based on presently playing media can be based on more than just a presently playing media file. The modification may be based on multiple recently-played media files (e.g., the last N media files or the media files played within the last thirty minutes).

FIG. 2 illustrates an example of content in a media preferences database. The illustrated media preferences database may be the media preferences database 112 that is illustrated in FIG. 1. The database can include, for each particular user of multiple users of an online media service, an indication of the media that the particular user has played and in information for identifying a state in which the media was played. For illustrative purposes, FIG. 2 only illustrates media content that has been played by a single user of the online media service, although the database may further identify media that was played by other users of the online media service.

The media preferences database illustrates that a particular user has played three songs (i.e., Song A 210, Song B 240, and Song C 260). For each of the songs, the media preferences database has stored the time that the song was played 282, the starting geographical location at which the song began to play 284, the ending geographical location at which the song ended playing 286, and a user-defined statement 288 that was generated during the time that the song was played, or within a predetermined time of the song being played.

In this example, Song A 210 has been played three times, all during a weekday evening (e.g., a Tuesday Evening 212, a Wednesday Evening 222, and a Thursday Evening 232). For each playing of the song, the user started playing the song while at work (e.g., starting locations 214, 224, and 234), and the song ended while the user was at his home (e.g., ending locations 216, 226, and 236). The user provided a single user-defined content during each instance that Song A 210 was played. Specifically, the user texted "Driving Home!" 218, emailed a message that included the content "Done with work" 228, and submitted a voice query "pizza places" 238.

In this example, Song B 240 has been played two times, both times on a Saturday morning. For example, the user played the song at 8:30 am on Aug. 14, 2010 and at 9:56 am on Aug. 21, 2010. In both examples, the user had moved from a starting location to an ending location that was several hundred meters away (e.g., because the user had been out running). The geographical locations, in this example, are provided in geographical coordinates. During the Aug. 14, 2010 instance of playing the song, the user did not provide any user-defined content. During the Aug. 21, 2010 instance of playing the song, however, the user submitted a micro-blog post that stated "Running!" to a micro-blogging service.

In this example, Song C 260 has been played two times, both times around noon during the week. In both examples, the user remained in the same zip code 55454. The calendar entry during each playing of the song was titled "Exercise at gym."

As shown in this example illustration of a media preferences database, a user of a mobile device may play a particular media file when the mobile device is in a particular state. For instance, Song A 210 is played on the user's way home from work each day. Song B 240 is played while the user runs on Saturday mornings. Song C 260 is played during the user's lunch break and while the mobile device is at the gym. Thus, the user's activity may be inferred from a state of the mobile device. Accordingly, when the mobile device enters a similar state in the future, songs may be selected based on the state, and loaded to the mobile device.

The media preferences database may store state information in varying representations. For examples, the time played data 282 can be represented by an absolute time and date (e.g., as with time played 242), or can be represented by a reoccurring time period within which the media was played (e.g., as with time played 212). The starting location 284 and ending location 286 may be represented by a user-defined region (e.g., location 214), geographical coordinates (e.g., location 244), or a predefined geographical region (e.g., location 264). Example predefined geographical regions can include bounded zip code regions, neighborhoods, cities, and states. Other predefined geographical regions can include venues at which a user has "checked-in" using a micro-blogging messaging service.

Figure 3:
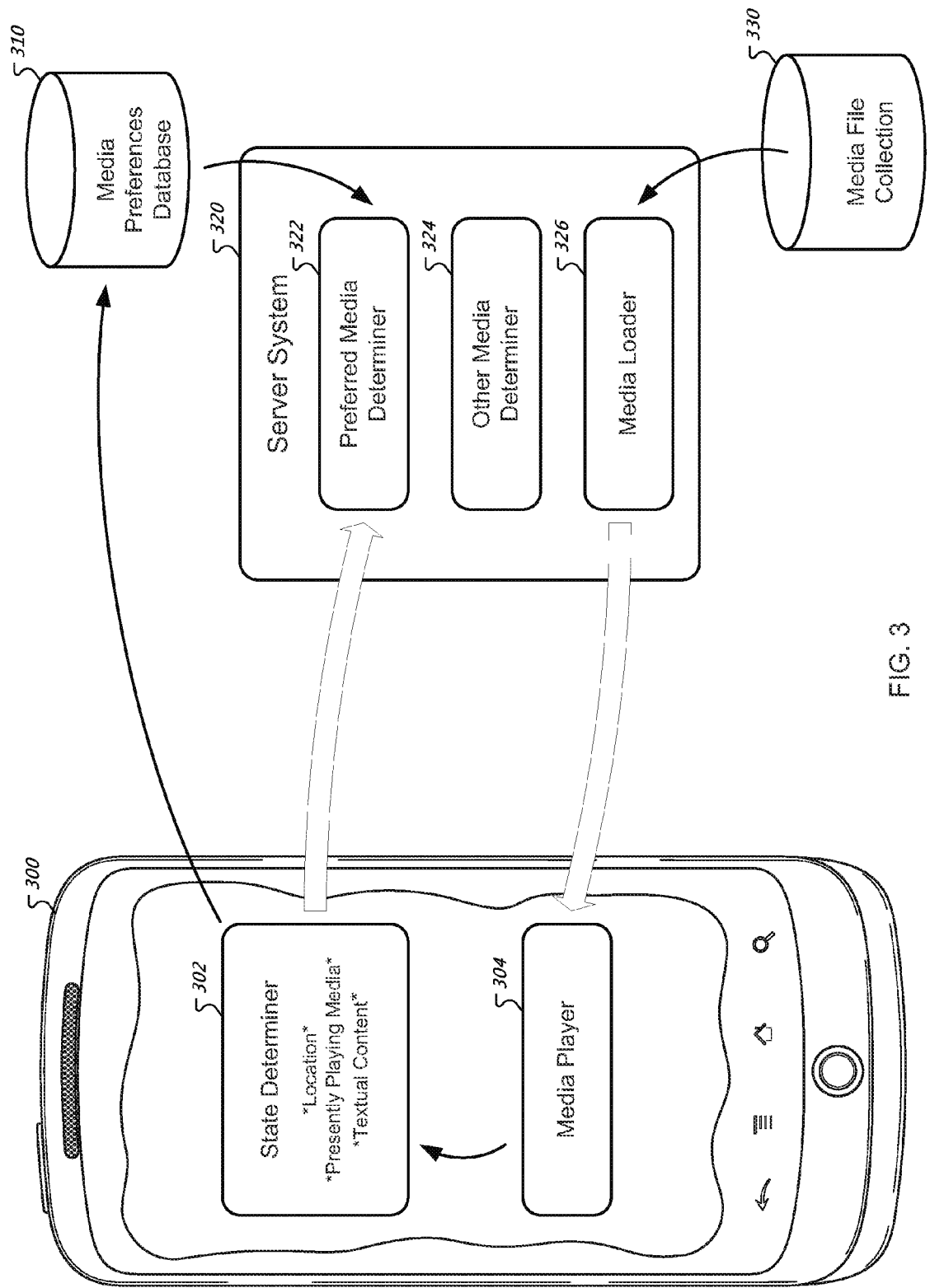
FIG. 3 illustrates an example of a system for loading a mobile computing device with media files.

FIG. 3 illustrates an example of a system for loading a mobile computing device with media files. The system includes a mobile computing device 300, at which media files are to be loaded. The mobile device 300 includes a state determiner 302 for determining a state of the mobile computing device, and for transmitting the present state to a media preferences database 310 for storage. The server system 320 includes a preferred media determiner 322 which accesses the media preferences database 310 in order to determine media files that have been played during a previous state of the mobile computing device 322 that matches a present state. The server system 324 also includes an other media determiner 324 for identifying additional media files based on the preferred media files. A media loader 326 transmits the preferred and other media files from the media file collection 330 to the mobile computing device 300 for playing by the media player 304.

In greater detail, the mobile computing device 300 includes a state determiner 302 that determines a present geographical location of the mobile computing device 300, for example, using signals from a satellite-based navigation system or by using cell-tower triangulation. Further, the state determiner 302 may identify statements that a user defined using the mobile computing device 300, and media that is presently playing on the mobile computing device. The state determiner 302 may transmit this information to the server system 320 for storage in the media preferences database 310.

The media preferences database 310 includes information that describes previous media files that were played on the mobile computing device 300, a time that the media files were played, a geographical location of the mobile device 300 when the media files were played, and user-defined statements that were submitted when the media files were played. The media preferences database 310 may be the same as the database that is described with relation to FIG. 2. The media preferences database 310 is described as being at the server system 320, but may be stored at the mobile device 300.

The preferred media determiner 322 determines media files that were played when the mobile device 300 was in a previous state that matches the present state. The preferred media determiner 322 performs the determination based, at least in part, on the information in the media preferences database 310.

The other media determiner 324 determines media that is similar to the preferred media. Media is determined to be similar to the preferred media if the similar media has been assigned descriptive attributes that match the descriptive attributes of the preferred media. The other media determiner 324 may additionally or alternatively determine media files that are prominently displayed in a sorting of a playlist.

The preferred media determiner 322 and the other media determiner 324 are illustrated as being located at the server system 320. In some examples, however, the preferred media determiner 322 and the other media determiner 324 are located at the mobile computing device 300. For example, the data in the media preferences database 310 may be stored locally on the mobile computing device 300. The mobile computing device 300 may, using a locally-stored preferred media determiner 322, determine the preferred media files which have been previously played during a similar state of the mobile computing device 300. In various examples, the other media determiner 324 is stored locally on the mobile computing device 324, and works either alone or in cooperation with the server system 320 to identify the other media files which are similar to the preferred media files. The locally-stored preferred media determiner 322 and the other media determiner 324 may transmit to the server system 320 an identification of the preferred media files and other media files, for use by the media loader 326.

The media loader 326 retrieves the preferred media files and the other media files 324 from the media file collection 330, and transmits the retrieved media files to the mobile device 300 for storage in locally-accessible memory. In some examples, instead of the entire media files being transmitted to the mobile device 300, only a portion of the media files are transmitted to the mobile device. The portion may be a beginning portion of the media files, or a portion of the media files for playing a first timed-portion of the playable media content in the media files. Thus, the media player 304 at the mobile device 300 may be able to begin playing a media file that has been loaded without requesting a beginning portion of the media file from the server system 320. Instead, the mobile device 300 may only need to receive a remaining portion of the playing media file 300.

The media player 304 may be an application program that is installed at the mobile computing device 300, or a website that is accessed using the mobile computing device 300. The media player 304 may enable the user of the mobile device 300 to browse a catalog of music that is stored, for the user of the mobile device 300, at the server system 320 in the media file collection 330. The user may provide user input that causes the media player 304 to play selected media. If the selected media file, or a portion thereof, is not already loaded to the mobile device 300 upon receiving the user input for causing the media file to play, the media player 304 may request that the media loader 326 stream the selected media file to the mobile device 300. If the selected media file, or a portion thereof, is already loaded to the mobile device 300, the media player 304 may play the loaded media file, or the portion thereof. The remaining portion may be requested from the server system 320.

Figure 4:
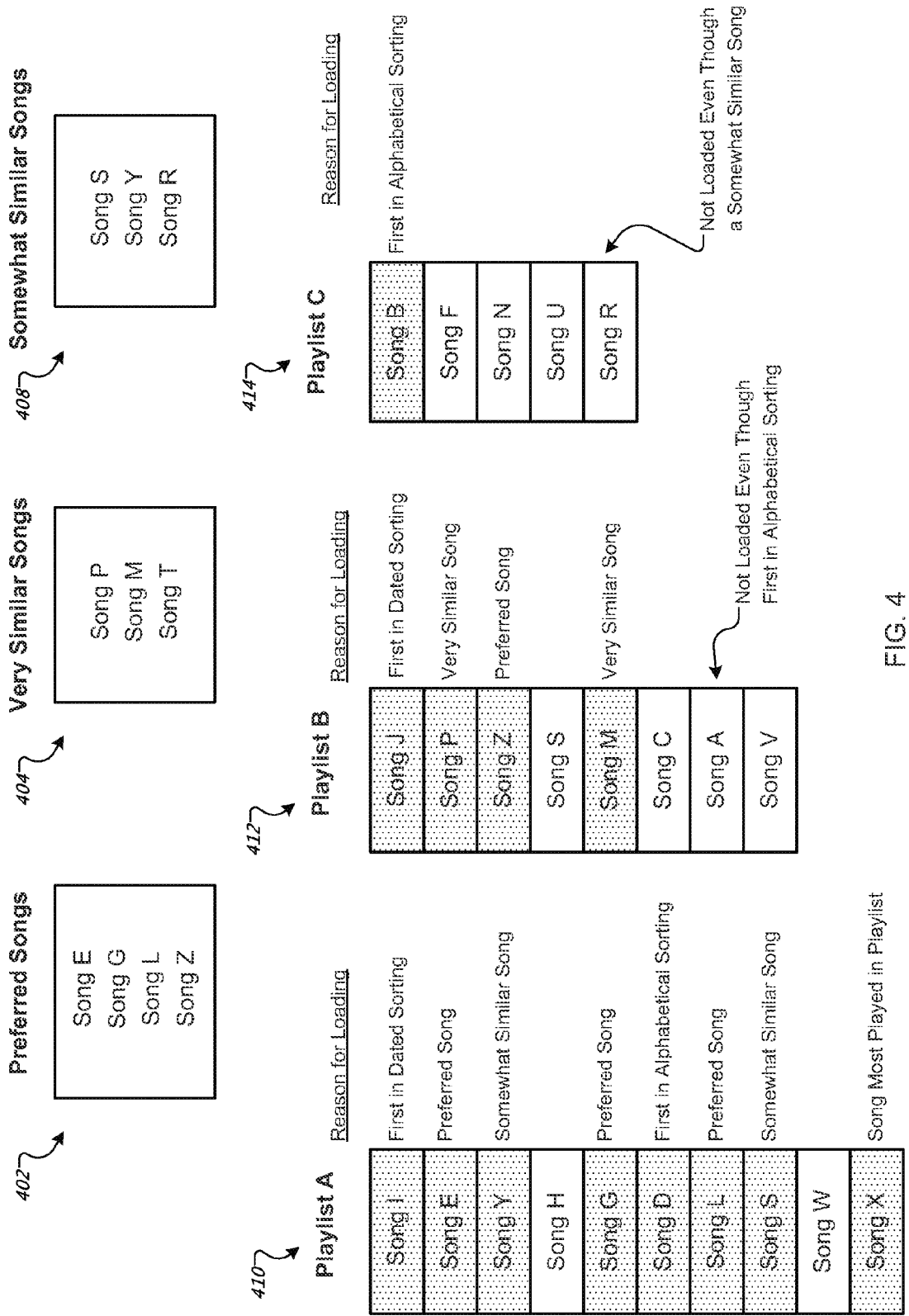
FIG. 4 illustrates an example of songs in a media collection, and a subset of the songs that have been loaded to a mobile computing device.

FIG. 4 illustrates an example of songs in a media collection, and a subset of the songs that have been loaded to a mobile computing device. In this example, a media collection that is stored at a server system for a user of a mobile device includes songs A-Z. Based on a present state of the mobile device, and previous states during which each of the songs A-Z were played, the preferred media determiner 322 selects songs E-Z as being preferred songs 402 (e.g., those songs that were played during a previous state that matches the present state).

Based on the preferred songs 402, the other media determiner 324 selects similar songs 404 and 408. In the illustration of FIG. 4, the similar songs are broken into two categories, very similar songs 404 and somewhat similar songs 408. The variance in determined similarity may be based, at least in part, on the quantity of descriptive attributes that the similar songs 404 and 408 match with the preferred songs 402.

Playlist A 410, Playlist B 412, and Playlist C 414 are user-defined playlists that each include multiple songs, of which some of the multiple songs have been loaded to the mobile computing device. The songs that have been loaded to the mobile computing device are shaded, while the non-shaded songs have not been loaded to the mobile computing device. Next to each of the songs that have been loaded to the mobile computing device is a reason that the songs were loaded.

Referencing the songs in Playlist A 410, the Songs E, G, and L were loaded to the mobile device because the songs were determined to be preferred songs 402. Accordingly, all preferred songs may be loaded to a mobile computing device. In this example, the somewhat similar songs Y and S were also loaded. As discussed below, songs that have been determined to be somewhat similar may not always be loaded to the mobile device. In some examples, somewhat similar songs are loaded to the mobile device when the somewhat similar songs are included in a playlist that meets a relevance criteria. An example relevance criteria includes the playlist including a quantity of preferred songs that exceeds a threshold number of preferred songs, or a percentage of the songs in the playlist exceeding a threshold percentage of songs. With reference to Playlist A 410, three of ten songs in the playlist are preferred songs. The three preferred songs may exceed example thresholds of two songs or 25% of songs in the playlist.

In this example, Song I has been loaded because Song I is the first song in a dated sorting of the playlist (e.g., a sorting of the songs in the playlist by date the song was added to the media library). The dated sorting may be a sorting for which Playlist A is presently configured to display on the mobile computing device.

In this example, Song D has also been loaded. Although Song D may not be a preferred or similar song, Song D has been selected because it is the first song in an alphabetical sorting of Playlist A. Although Playlist A may not be presently configured to display in an alphabetical sorting, the user of the mobile computing device may have the option to change the display so that the songs are displayed in an alphabetically sorted order. In this example, Song D, as the most-prominently displayed song in a non-current sorting of the playlist, is loaded because Playlist A exceeds the above-described threshold. In examples where the playlist may not exceed the threshold, the most-prominently displayed song in a non-current sorting of the playlist may not be loaded.

In this example, Song X has been loaded because Song X is the most played song in the playlist. A most played song in a playlist may be loaded when a playlist exceeds the above-described threshold.

Playlist B 412 may be another user-defined playlist of songs from the media collection. In this example, Song Z has been loaded because the song is a preferred song. Also, songs P and M may be loaded because the songs are very similar songs. Very similar songs in a playlist may be loaded all the time, or may be loaded whenever a threshold amount of preferred songs are found in the threshold. In this example, the threshold was one preferred song, and thus the very similar songs Z and M are loaded.

In this example, Song J has been loaded because Song J is the first song in a dated sorting of the playlist (where the dated sorting is a current sorting of the playlist). In some examples, the first song in a current sorting of a playlist is always loaded to the mobile device. In other examples, the playlist must include a threshold of preferred songs (counted alone or with the similar songs) in order for the first song in the current ordering to be loaded. In this example, Song A has not been loaded even though Song A is a first song in an alphabetical (non-current) sorting of the playlist. Song A may not be loaded because Playlist B may not include a threshold amount of preferred songs.

Playlist C 414 may be another user-defined playlist of songs from the media collection. In this example, the playlist includes no preferred songs 402, no very similar songs 404, and a single somewhat similar song (Song R). Song R has not been loaded because Playlist C 414 has not been determined to include a threshold amount of preferred songs. In this example, however, Song B is loaded because Song B is a first song in an alphabetical (current) sorting of the playlist. In some examples, a first N songs in a current sorting of the playlist will be loaded, irrespective of whether the playlist includes any preferred songs.

Although the description with respect to FIG. 4 references a selection of songs based on a presence of preferred songs in a playlist, similar concepts may be applied to media files other than songs (e.g., video files) and collections of songs other than user-defined playlists (e.g., computer-generated playlists, listings of songs in an album, listings of songs for an album artist, and listings of songs for a genre).

Figure 5:
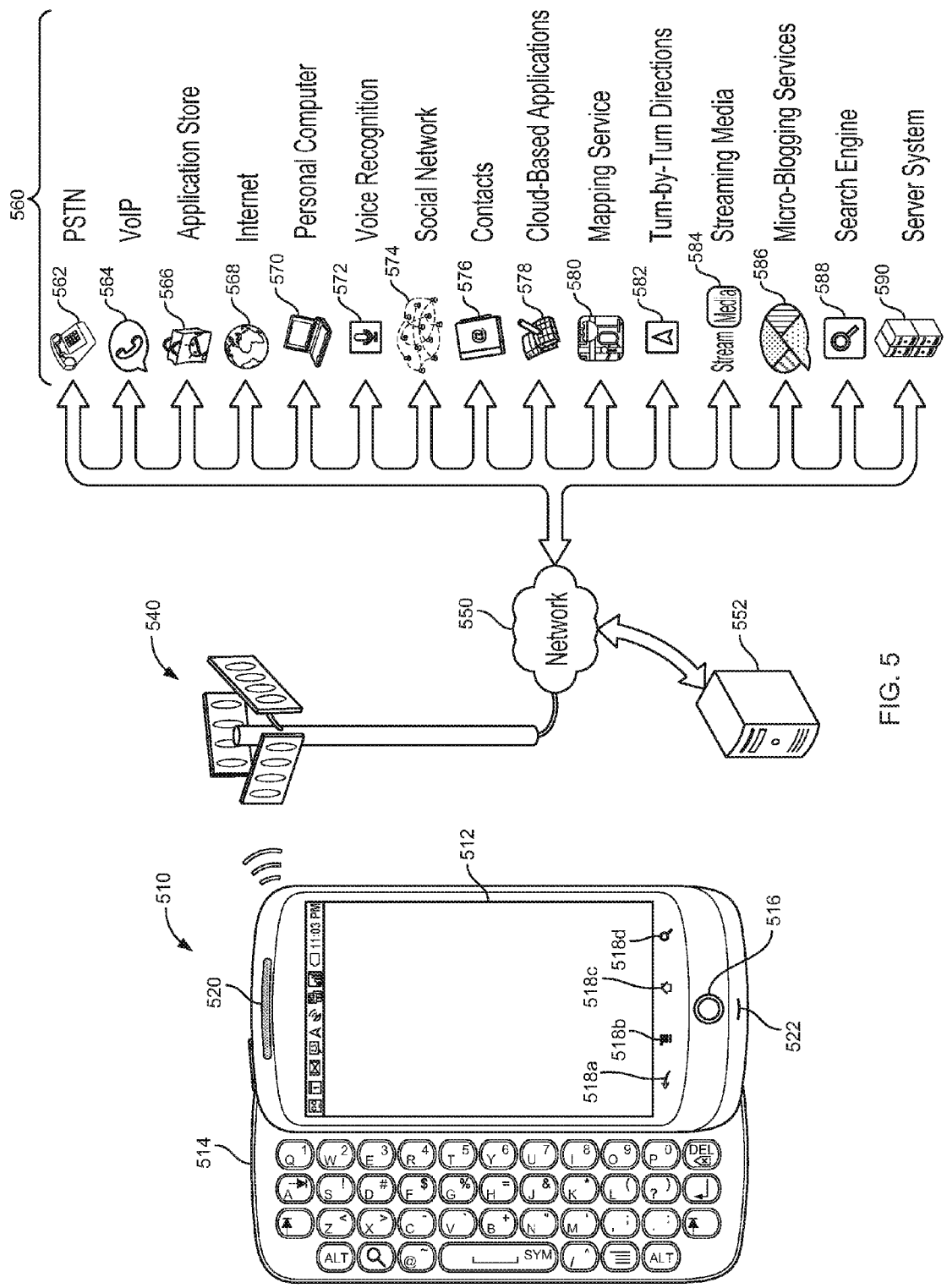
FIG. 5 is a diagram of a system that may be used to implement the systems and methods described in this document.

Referring now to FIG. 5, a conceptual diagram of a system that may be used to implement the systems and methods described in this document is illustrated. Mobile computing device 510 can wirelessly communicate with base station 540, which can provide the mobile computing device wireless access to numerous services 560 through a network 550.

In this illustration, the mobile computing device 510 is depicted as a handheld mobile telephone (e.g., a smartphone or an application telephone) that includes a touchscreen display device 512 for presenting content to a user of the mobile computing device 510. The mobile computing device 510 includes various input devices (e.g., keyboard 514 and touchscreen display device 512) for receiving user-input that influences the operation of the mobile computing device 510. In further implementations, the mobile computing device 510 may be a laptop computer, a tablet computer, a personal digital assistant, an embedded system (e.g., a car navigation system), a desktop computer, or a computerized workstation.

The mobile computing device 510 may include various visual, auditory, and tactile user-output mechanisms. An example visual output mechanism is display device 512, which can visually display video, graphics, images, and text that combine to provide a visible user interface. For example, the display device 512 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 512). Further, the mobile computing device 510 may include one or more speakers 520 that convert an electrical signal into sound, for example, music, an audible alert, or voice of an individual in a telephone call.

An example mechanism for receiving user-input includes keyboard 514, which may be a full qwerty keyboard or a traditional keypad that includes keys for the digits '0-9', '*' and '#.' The keyboard 514 receives input when a user physically contacts or depresses a keyboard key. User manipulation of a trackball 516 or interaction with a trackpad enables the user to supply directional and rate of rotation information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" user interface that is displayed upon turning on the mobile computing device 510, activating the mobile computing device 510 from a sleep state, upon "unlocking" the mobile computing device 510, or upon receiving user-selection of the "home" button 518c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 510 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 510 may include other application modules and hardware. A call handling unit may receive an indication of an incoming telephone call and provide a user capabilities to answer the incoming telephone call. A media player may allow a user to listen to music or play movies that are stored in local memory of the mobile computing device 510. The mobile telephone 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., Ethernet, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computerized devices that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing devices associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call with a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 6:
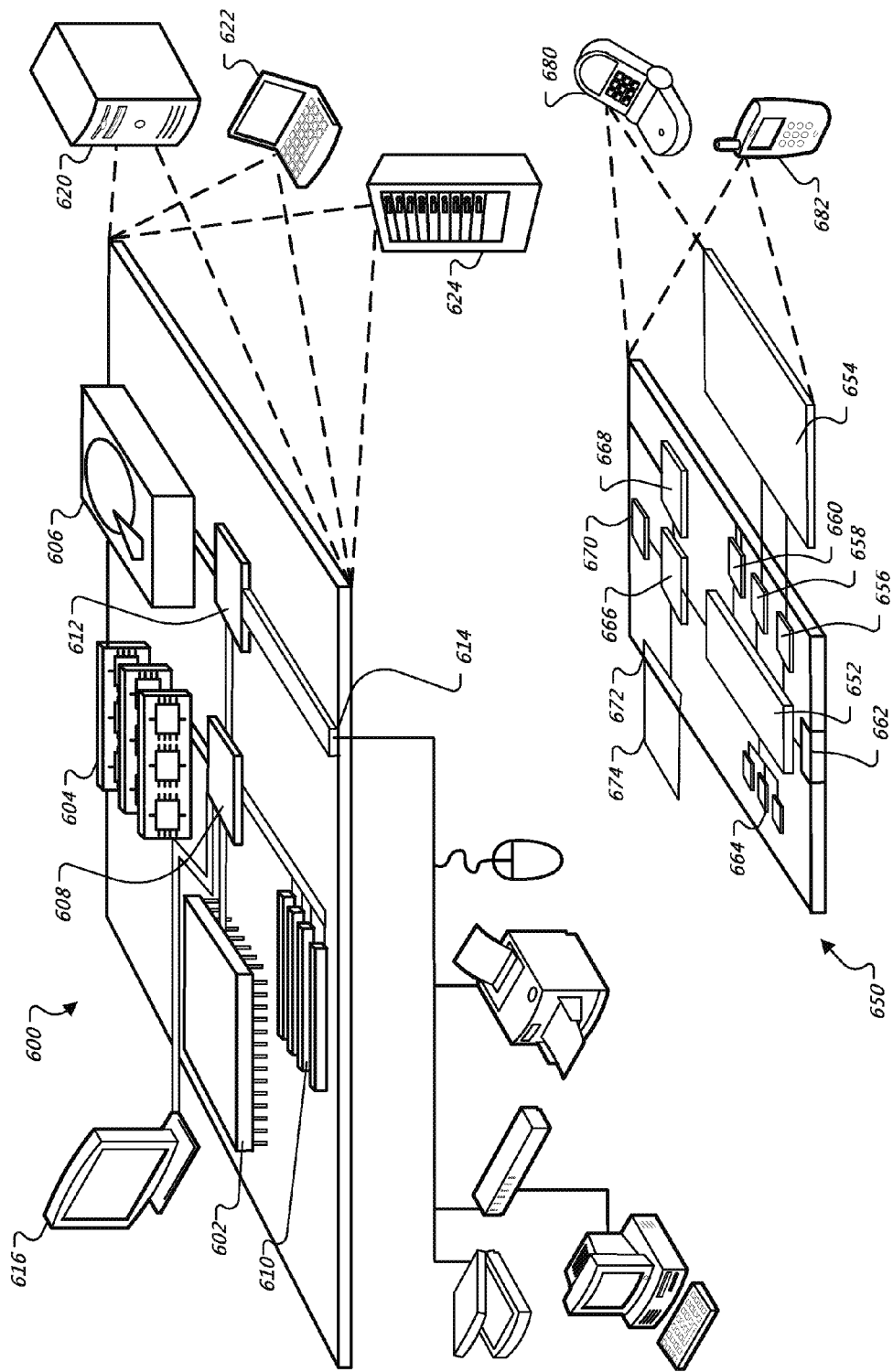
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
storing, at a server system, a media library that includes a set of media files that are stored by the server system for a user of a computing device;
accessing information that indicates a present state of the computing device, wherein the present state was determined based on the computing device being at a present geographical location;
accessing information that indicates a previous state of the computing device, wherein the previous state was determined based on the computing device being at a previous geographical location;
determining that the present state of the computing device matches the previous state of the computing device;
in response to determining that the present state of the computing device matches the previous state of the computing device, determining at least one preferred media file that is associated with the previous state of the computing device;
determining one or more additional media files from the set of media files based on one or more characteristics of the at least one preferred media file corresponding to one or more characteristics of the one or more additional media files;
selecting a group of media files that are not stored at the computing device to be loaded onto the computing device, the group including the at least one preferred media file and the one or more additional media files; and
transmitting, via the Internet, by the server system and to the computing device, at least a portion of each of the media files in the selected group without receiving input from the user that requests transmission of the media files in the selected group, wherein the computing device outputs any of the portions of the media files in the selected group at a later time without communicating with the server system.

2. The computer-implemented method of claim 1, wherein the determination that the present state matches the previous state was made based on a determination that the present geographical location is within a predetermined distance of the previous geographical location.

3. The computer-implemented method of claim 1, wherein the determination that the present state matches the previous state was made based on a determination that the present geographical location is bounded within an area that also bounds the previous geographical location.

4. The computer-implemented method of claim 1, wherein the determination that the present state matches the previous state was made based on a distance between the present geographical location and the previous geographical location, wherein a likelihood of a match between the present state and the previous state increases with a shorter distance between the present geographical location and the previous geographical location.

5. The computer-implemented method of claim 1, wherein the information that indicates the present state of the computing device was further determined based on a statement that was defined by the user of the computing device at the present geographical location;
wherein the information that indicates the previous state of the computing device was further determined based on a statement that was defined by the user of the computing device at the previous geographical location.

6. The computer-implemented method of claim 1, further comprising receiving, at the server system and from the computing device, a request for causing the server system to transmit to the computing device at least some of the media files from the media library, wherein, in response to the request:
(i) the accessing information that indicates the present state of the computing device is performed, and
(ii) the accessing the information that indicates the previous state of the computing device is performed.

7. The computer-implemented method of claim 1, wherein the one or more characteristics of the at least one preferred media file identifies musical characteristics of the at least one preferred media file, and the one or more characteristics of the one or more additional media files identifies characteristics of the one or more additional media files.

8. The computer-implemented method of claim 1, wherein selecting the group of the media files includes selecting from the media library additional media files that are starting media files in particular user-generated playlists, wherein a starting media file is a media file that begins a playlist based on a sorting of the playlist.

9. The computer-implemented method of claim 8, wherein the particular user-generated playlists are a subset of a collection of user-generated playlists, and where the particular user-generated playlists are selected as the subset based on the particular user-generated playlists including a predetermined quantity of the preferred media files.

10. The computer-implemented method of claim 1, wherein selecting the group of the media files includes selecting from the media library at least two additional media files based on the at least two additional media files being starting media files for different sortings of a particular playlist.

11. The computer-implemented method of claim 10, wherein the particular playlist is not displayed by the computing device in at least one of the sortings without the user of the computing device providing user input that causes the particular playlist to be displayed in the at least one sorting.

12. One or more computer-readable storage devices storing instructions embodied on the one or more computer-readable storage devices that, when executed by one or more processing devices, perform operations comprising:
storing, at a server system, a media library that includes a set of media files that are stored by the server system for a user of a computing device;
accessing information that indicates a present state of the computing device, wherein the present state was determined based on the computing device being at a present geographical location;
accessing information that indicates a previous state of the computing device, wherein the previous state was determined based on the computing device being at a previous geographical location;
determining that the present state of the computing device matches the previous state of the computing device;
in response to determining that the present state of the computing device matches the previous state of the computing device, determining at least one preferred media file that is associated with the previous state of the computing device;
determining one or more additional media files from the set of media files based on one or more characteristics of the at least one preferred media file corresponding to one or more characteristics of the one or more additional media files;

selecting a group of media files that are not stored at the computing device to be loaded onto the computing device, the group including the at least one preferred media file and the one or more additional media files; and transmitting, via the Internet, by the server system and to the computing device, at least a portion of each of the media files in the selected group without receiving input from the user that requests transmission of the media files in the selected group, wherein the computing device outputs any of the portions of the media files in the selected group at a later time without communicating with the server system.

13. A computer-implemented method, the method comprising:

determining, by a computing device, a present geographical location of the computing device and transmitting the present geographical location for receipt by a server system; and receiving, at the computing device and from the server system, at least a portion of each media file in a group of media files that have been selected from a media library that is stored at the server system for a user of the computing device, the at least portions of the media files being received in response to the server system:

accessing information that indicates a present state of the computing device, wherein the present state was determined based on the computing device being at the present geographical location;

accessing information that indicates a previous state of the computing device, wherein the previous state was determined based on the computing device being at a previous geographical location;

determining that the present state of the computing device matches the previous state of the computing device;

in response to determining that the present state of the computing device matches the previous state of the computing device, determining at least one preferred media file that is associated with the previous state of the computing device;

determining one or more additional media files from a set of media files associated with the media library based on one or more characteristics of the at least one preferred media file corresponding to one or more characteristics of the one or more additional media files;

selecting the group of media files that are not stored at the computing device to be loaded onto the computing device, the group including the at least one preferred media file and the one or more additional media files; and transmitting, via the Internet, by the server system and to the computing device, the portion of each of the media files in the selected group without receiving input from the user that requests transmission of the media files in the selected group, wherein the computing device outputs any of the portions of the media files in the selected group at a later time without communicating with the server system.

14. The computer-implemented method of claim 13, further comprising generating, by the computing device for display on the computing device, a playlist of the media files that includes only the media files in the selected group.

15. One or more computer-readable storage devices storing instructions embodied on the one or more computer-readable storage devices that, when executed by one or more processing devices, perform operations comprising:

determining, by a computing device, a present geographical location of the computing device and transmitting the present geographical location for receipt by a server system; and receiving, at the computing device and from the server system, at least a portion of each media file in a group of media files that have been selected from a media library that is stored at the server system for a user of the computing device, the at least portions of the media files being received in response to the server system:

accessing information that indicates a present state of the computing device, wherein the present state was determined based on the computing device being at the present geographical location;

accessing information that indicates a previous state of the computing device, wherein the previous state was determined based on the computing device being at a previous geographical location;

determining that the present state of the computing device matches the previous state of the computing device;

in response to determining that the present state of the computing device matches the previous state of the computing device, determining at least one preferred media file that is associated with the previous state of the computing device;

determining one or more additional media files from a set of media files associated with the media library based on one or more characteristics of the at least one preferred media file corresponding to one or more characteristics of the one or more additional media files;

selecting the group of media files that are not stored at the computing device to be loaded onto the computing device, the group including the at least one preferred media file and the one or more additional media files; and transmitting, via the Internet, by the server system and to the computing device, at least a portion of each of the media files in the selected group without receiving input from the user that requests transmission of the media files in the selected group, wherein the computing device outputs any of the portions of the media files in the selected group at a later time without communicating with the server system.

16. The computer-implemented method of claim 1, wherein the at least one preferred media file is associated with the previous state of the computing device as a result of the user of the computing device requesting, during the previous state of the computing device, that the at least one preferred media file be output by the computing device.

* * * * *